(12) United States Patent
Tofts et al.

(10) Patent No.: US 8,250,363 B2
(45) Date of Patent: Aug. 21, 2012

(54) METHOD OF PROVISIONING DEVICES WITH ONE-TIME PAD DATA, DEVICE FOR USE IN SUCH METHOD, AND SERVICE USAGE TRACKING BASED ON ONE-TIME PAD DATA

(75) Inventors: Christopher Tofts, Stoke Gifford Bristol (GB); Timothy Paul Spiller, Stoke Gifford Bristol (GB); William John Munro, Stoke Gifford Bristol (GB); Martin Sadler, Stoke Gifford Bristol (GB); Keith Alexander Harrison, Stoke Gifford Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1571 days.

(21) Appl. No.: 11/490,852

(22) Filed: Jul. 21, 2006

(65) Prior Publication Data

US 2007/0074277 A1    Mar. 29, 2007

(30) Foreign Application Priority Data

Sep. 29, 2005   (GB) .................................. 0519842.9
Oct. 28, 2005   (GB) .................................. 0521933.2

(51) Int. Cl.
*H04L 26/06* (2006.01)
(52) U.S. Cl. ......... 713/162; 380/277; 380/278; 380/283
(58) Field of Classification Search ................... 713/162
See application file for complete search history.

(56) References Cited

U.S. PATENT DOCUMENTS 5,483,598 A * 1/1996 Kaufman et al. ............... 380/43
(Continued)

FOREIGN PATENT DOCUMENTS

EP    1 075 108 A1    2/2001
(Continued)

OTHER PUBLICATIONS

Kwon et al., Authenticated key exchange protocols resistant to password guessing attacks, Oct. 1998, Communications IEEE Proceedings, vol. 145 No. 5, pp. 304-308.*

(Continued)

*Primary Examiner* — Taghi Arani
*Assistant Examiner* — Kenneth Chang

(57) ABSTRACT

Secret random data is distributed to a plurality of devices to provision them with new one-time pad data for use in interacting with apparatus holding the same one-time pad data. This distribution is effected by provisioning a first device with a block of secret random data that is, or will become, available to the apparatus. Part of the secret random data is then distributed from the first device to one or more other devices in a hierarchical distribution pattern headed by the first device. Each device, other than those at the bottom of the distribution hierarchy, retains part of the secret random data it receives and passes on the remainder. Each device uses that part of the secret random data it has retained to provide the device with new one-time pad data. A method is also provided for tracking service usage based on the distributed one-time pad data.

21 Claims, 4 Drawing Sheets

U.S. PATENT DOCUMENTS

| | | | |
|---|---|---|---|
| 5,764,767 A * | 6/1998 | Beimel et al. | 713/180 |
| 6,104,811 A * | 8/2000 | Aiello et al. | 380/46 |
| 6,266,413 B1 * | 7/2001 | Shefi | 380/46 |
| 2002/0002675 A1 * | 1/2002 | Bush | 713/160 |
| 2002/0146119 A1 * | 10/2002 | Liss | 380/42 |
| 2003/0026431 A1 * | 2/2003 | Hammersmith | 380/277 |
| 2003/0039357 A1 * | 2/2003 | Alten | 380/46 |
| 2003/0048909 A1 * | 3/2003 | MacKenzie et al. | 380/278 |
| 2003/0142821 A1 * | 7/2003 | Ross | 380/46 |
| 2003/0149869 A1 * | 8/2003 | Gleichauf | 713/153 |
| 2005/0105734 A1 * | 5/2005 | Buer et al. | 380/270 |
| 2005/0226420 A1 * | 10/2005 | Makela et al. | 380/270 |
| 2006/0059347 A1 * | 3/2006 | Herz et al. | 713/176 |

FOREIGN PATENT DOCUMENTS

| | | |
|---|---|---|
| GB | 2 389 693 A | 12/2003 |
| WO | 2004/073234 A2 | 8/2004 |

OTHER PUBLICATIONS

Lindquist et al., A Java cryptography service provider implementing one-time pad, Jan. 2004, Proceedings of the 37th Annual Hawaii International Conference on System Sciences, pp. 1-6.*

* cited by examiner

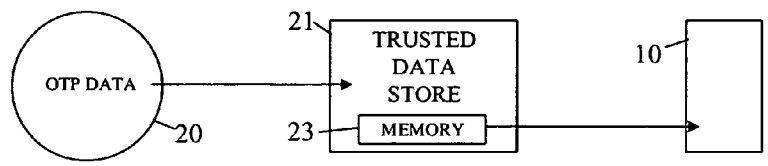
Figure 2A
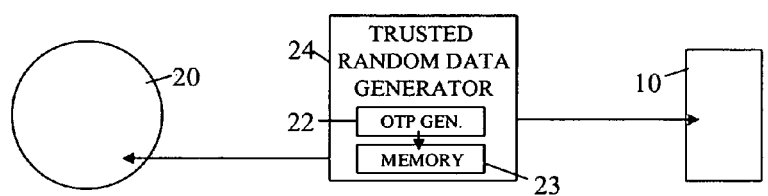
Figure 2B
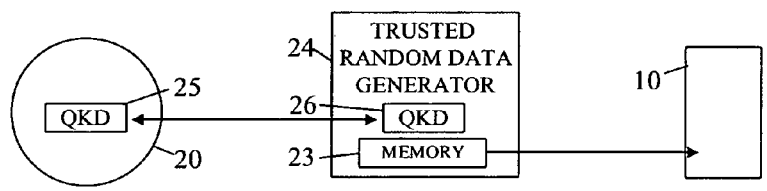
Figure 2C
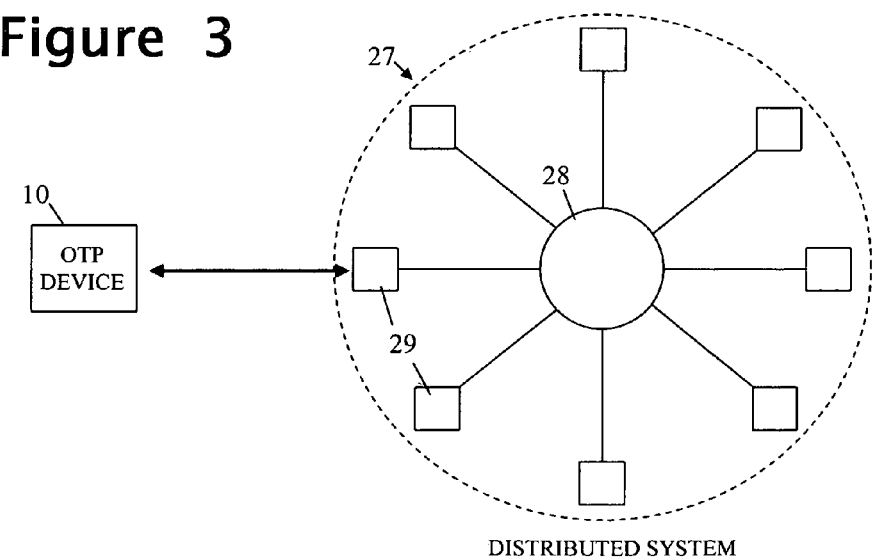

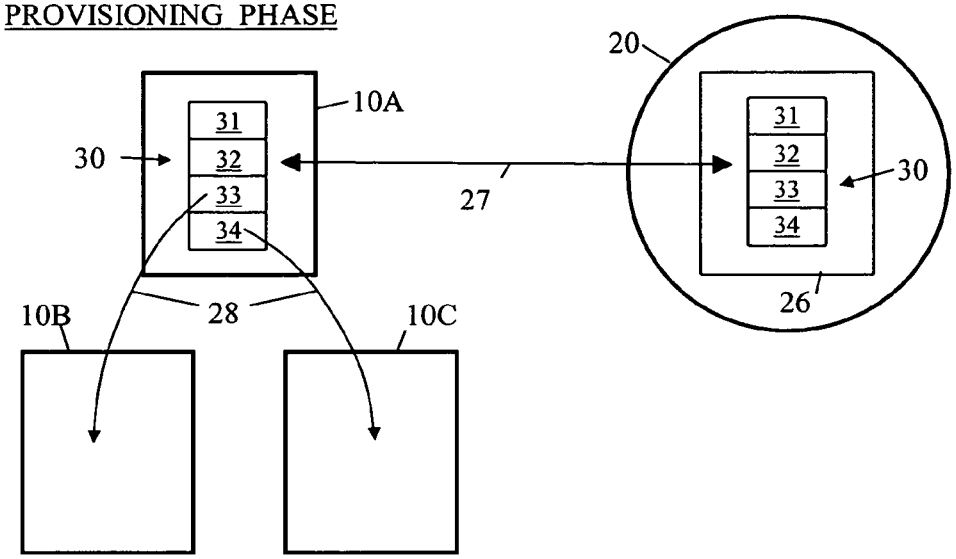
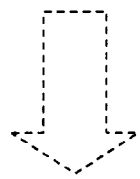
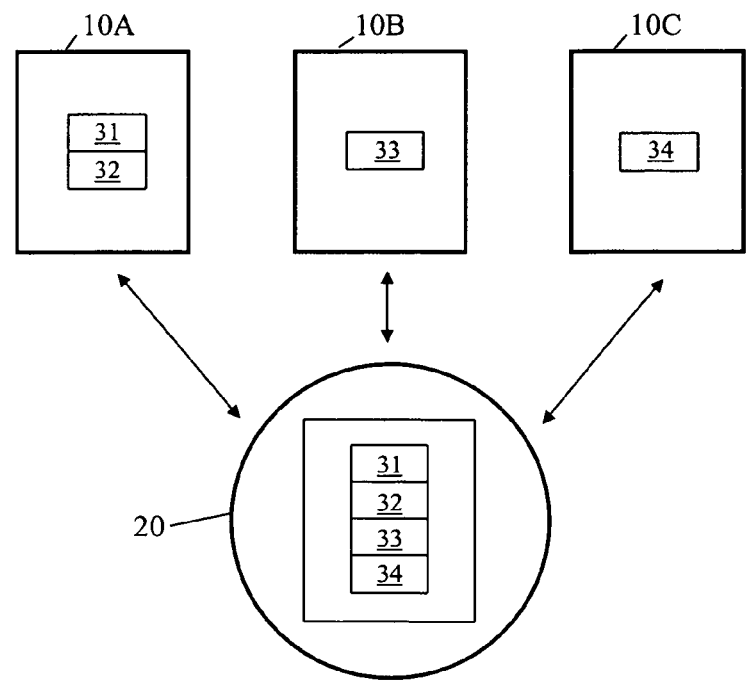
Figure 4

METHOD OF PROVISIONING DEVICES WITH ONE-TIME PAD DATA, DEVICE FOR USE IN SUCH METHOD, AND SERVICE USAGE TRACKING BASED ON ONE-TIME PAD DATA

FIELD OF THE INVENTION

The present invention relates to a method of provisioning devices with one-time pad data, to a device for use in implementing this method, and to service usage tracking based on one-time pad data.

BACKGROUND OF THE INVENTION

As is well known, two parties that posses the same secret random data can provably achieve both unbreakable secure communication using the Vernam cipher, and discrimination between legitimate messages and false or altered ones (using, for example, Wegman-Carter authentication). In both cases, however, data used from the secret random data shared by the parties must not be re-used. The term "one-time pad" is therefore frequently used to refer to the secret random data shared by the parties and this term, or its acronym "OTP", is used herein for secret random data shared by more than one party. Although for absolute security the one-time pad data must be truly random, references to one-time pads (OTP) herein includes secret data that may not be truly random but is sufficiently random as to provide an acceptable degree of security for the purposes concerned.

The fact that the OTP data is effectively consumed when used gives rise to a major drawback of the employment of OTP cryptographic systems, namely that the OTP must be replenished.

One approach to sharing new OTP data between two parties is for one party to generate the new OTP data and then have a copy of the data physically transported in a storage medium to the other party. This is costly to do, particularly where it needs to be done frequently; furthermore, it may not be feasible to adopt this approach (for example, where one of the parties is a communications satellite).

Another approach is to send the OTP data over a communications link encrypted using a mathematically-based encryption scheme. However, this approach effectively reduces the security level to that of the encryption scheme used; since no such schemes are provable secure and may well prove susceptible to attack as a result of advances in quantum computing, this approach is no better than replacing the intended OTP system with a mathematically-based scheme.

More recently, quantum key distribution (QKD) methods and systems have been developed which enable two parties to share random data in a way that has a very high probability of detecting any eavesdroppers. This means that if no eavesdroppers are detected, the parties can have a high degree of confidence that the shared random data is secret. QKD methods and systems are described, for example, in U.S. Pat. No. 5,515,438 and U.S. Pat. No. 5,999,285. In known QKD systems, randomly polarized photons are sent from a transmitting apparatus to a receiving apparatus either through a fiber-optic cable or free space.

As a consequence of the actual and perceived problems of sharing secret random data, OTP cryptographic systems have generally only been used in applications where the security requirements are paramount such as certain military and government applications.

Because OTP cryptography is generally only employed where very high security is needed, the types of system where it is used are those where other components of the overall system do not significantly compromise the level of security provided by OTP cryptography. In particular, there is little point in using OTP cryptography for passing secret messages between parties if the messages are to be stored or subsequently transmitted in a manner that is significantly less secure. Furthermore, the storage of the OTP data itself represents a security threat and unless the OTP data can be stored in a highly secure manner, it is better to share OTP data only at a time immediately before it is to be consumed.

SUMMARY OF THE INVENTION

It is an insight of the present inventors that OTP data can usefully be employed in systems with less than the highest levels of security and in such cases it is possible to share OTP data by more flexible methods.

According to one aspect of the present invention, there is provided a method of provisioning a plurality of devices with respective new one-time pad data for use in interacting with apparatus holding the same one-time pad data; the method comprising:
  provisioning a first said device with a block of secret random data that is, or will become, available to said apparatus;
  distributing the secret random data received by the first device between said devices in a hierarchical distribution pattern headed by the first device; each device, other than those at the bottom of the distribution hierarchy, retaining a part of the secret random data it receives and passing on respective parts of the remaining data to the or each device dependent from it in the distribution hierarchy,
  using that part of the secret random data retained by each device to provide the device with its said new one-time pad data.

According to another aspect of the present invention, there is provided a method of tracking service usage in a system comprising a plurality of devices each with a one-time pad provisioned with one-time pad data according to the method of the foregoing paragraph, and apparatus holding one-time pads matching those of the devices, the apparatus serving to control access to at least one service by requiring that any said device wishing to access a said service, prove its entitlement to do so by means of an interaction with the apparatus that consumes matching one-time pad data held by the device and the apparatus; the method of tracking service usage comprising:
  keeping a first record indicative of the distribution of said block of secret random data between said devices;
  creating a second record indicative, for each service usage by a said device, of the one-time pad, or one-time pad data, used to gain access to the service; and
  using the first and second records to determine the usage made of said at least one service by each device.

According to a further aspect of the present invention, there is provided a device comprising:
  a communications interface for transferring secret random data on and off the device;
  a memory for holding one-time pad data,
  a consumption arrangement for using one-time pad data from the memory to carry out a security-related task; and
  a provisioning arrangement for receiving secret random data via the communications interface, retaining a part of the received secret random data, and passing respective parts of the remainder of the received secret random data onto one or more other devices; the provisioning arrangement being arranged to use the retained part of the secret random data to provision the memory with new one-time pad data.

BRIEF DESCRIPTION OF THE DRAWINGS

Embodiments of the invention will now be described, by way of non-limiting example, with reference to the accompanying diagrammatic drawings, in which:

FIG. 2A is a diagram illustrating the use of a trusted data store to transfer OTP data;

FIG. 2B is a diagram illustrating the use of a first form of trusted random data generator to generate and distribute OTP data;

FIG. 2C is a diagram illustrating the use of a second form of trusted random data generator to generate and distribute OTP data;

FIG. 3 is a diagram depicting a user OTP device interacting with a distributed data processing system;

FIG. 4 is a diagram illustrating an hierarchical distribution of OTP data according to an embodiment of the invention.

BEST MODE OF CARRYING OUT THE INVENTION

Figure 1:
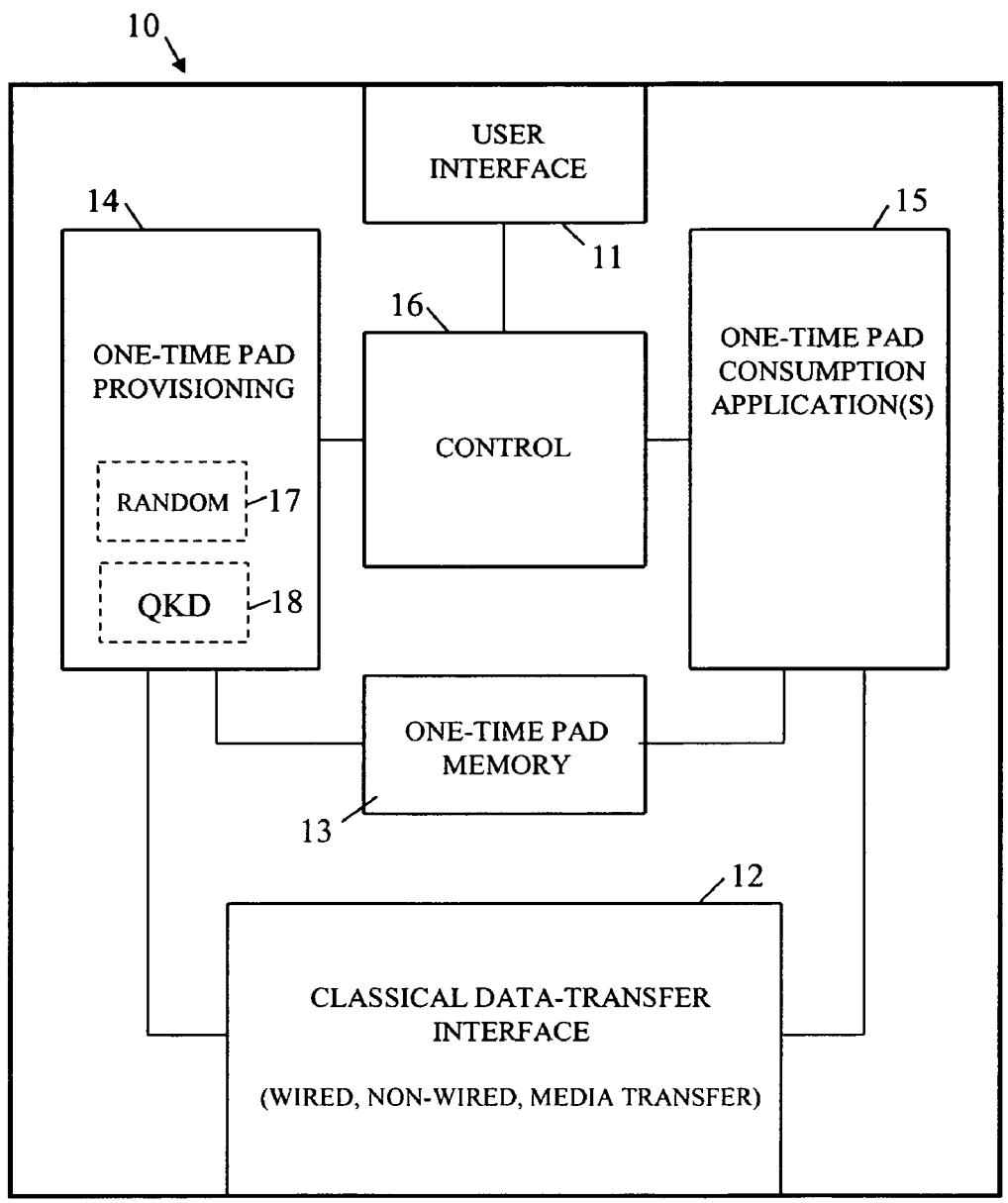
FIG. 1 is a diagram of a generalised form of user OTP device used in embodiments of the invention.

FIG. 1 shows, in generalized form, a user OTP device 10 for storing and using one-time pad data for various applications such as, for example, encryption and identification. Preferred embodiments of the device 10 are portable in form and are, for example, constituted by hand-held devices such as mobile phones and PDAs; however, other embodiments of the apparatus 10 can be of non-portable form such as a personal desktop computer.

In use, the OTP device 10 is intended to communicate with OTP apparatus having access to the same secret random data as the device 10 in order to conduct an OTP interaction (that is, an interaction requiring use of the same OTP data by the device and apparatus). Such OTP apparatus is hereinafter referred to as the "complementary OTP apparatus" with respect to the device 10; this apparatus can be of the same general form as the user OTP device 10 or can be of a different form and/or form part of a distributed system as will be described more fully hereinafter. Generally, the complementary OTP apparatus will be shown with a circular boundary in the Figures and will be referenced '20'.

The User OTP Device 10

The user OTP device 10 comprises the following functional blocks:

a user interface block 11 for interfacing with a user;
a classical data-transfer interface 12 for transferring data to and/or from external entities by wired or non-wired means, or by media transfer;
a memory 13 for storing OTP data;
an OTP provisioning block 14 which, through interaction with an external entity, is arranged to provide new secret random data for initializing or replenishing the memory 13 with OTP data;

an OTP consumption block 15 for carrying out one or more security-related applications that consume OTP data stored in memory 13; and
a control block 16 for controlling and coordinating the operation of the other blocks in response to inputs received through the user interface 11 and the data-transfer interface 12.

Typically, the functional blocks 11 to 16 are implemented using a program-controlled processor together with appropriate specialized sub-systems. Further details of each block are given below for the case where a processor-based system (including a main processor and associated memory) is used to carry out at least most of the data processing tasks of the device 10, such tasks including, in particular, the control and coordination tasks of control block 16 and the running of the security applications embodying the OTP consumption block 15.

User Interface 11

The user interface 11 typically comprises an LCD display and an input keypad but may also include audio input and/or output means.

Classical Data-Transfer Interface 12

The classical data-transfer interface 12 can comprise a non-wired interface such as a Bluetooth (Trademark) wireless interface or an IrDA infrared interface; however, a wired interface can alternatively or additionally be provided such as an USB interface (as used herein, the term "wired" is to be understood broadly to cover any type of interface that requires electrical elements to be brought into physical contact). For circumstances where transit delay is not an issue, it is also possible to implement the data-transfer interface 12 as a removable storage medium and related read/write arrangement.

OTP Memory 13

The OTP memory 13 can be part of the general memory associated with the main processor of device 10 or can be formed by a separate memory. In either case, the OTP data is preferably secured against unauthorized access by one or more appropriate technologies. For example, the memory 13 can all be provided in a tamper-resistant hardware package. Alternatively, a protected storage mechanism can be used in which all but the root of a hierarchy (tree) of encrypted data objects is stored in ordinary memory, the root of the hierarchy being a storage root key which is stored in a tamper-resistant hardware package and is needed to decrypt any of the other data objects of the hierarchy. Furthermore, trusted platform techniques can be used to ensure that only authorized software can access the OTP data. It is also possible to use QRAM (Quantum RAM) technologies.

Where the device 10 is designed such that OTP data is consumed immediately following its provisioning, the security requirements of memory 13 can be reduced (unless the device 10 is designed to operate unattended).

OTP Provisioning Block 14

With regard to the OTP provisioning block 14, the most secure way to share secret random data is to use a quantum key distribution method such as described in the documents referenced in the introduction to the present specification. In this case, the OTP provisioning block is provided with a QKD subsystem 17 that can be either a QKD transmitter or a QKD receiver. It is relatively straightforward to incorporate a QKD transmitter within a hand-held device and then to provide a cradle or similar mechanical arrangement to ensure that the device is properly optically aligned to interact with a fixed QKD receiver subsystem. In fact, it is possible to dispense with a mechanical alignment arrangement by the use of an automated or semi-automated alignment system such as is disclosed in our co-pending U.S. patent application Ser. No. 11/454,624 filed 16 Jun. 2006.

The OTP provisioning block 14 need not be built around a QKD subsystem and a number of alternative embodiments are possible. Thus, in one such alternative embodiment the OTP provisioning block 14 is simply be arranged to store to the OTP memory 13, secret random data received via the data-transfer interface 12 from either:

(i) OTP apparatus seeking to share secret random data with the device 10 either directly or via a trusted data store;
(ii) a trusted random data generator that has the role of generating secret random data and passing it both to the user device 10 and to OTP apparatus with which the device 10 is wishing to interact using shared OTP data FIG. 2A illustrates the use of a trusted data store 21 for transferring secret random data to the device 10. In FIG. 2A, secret random data provided by the complementary OTP apparatus 20 is first passed to the trusted data store where it is held in memory 23 before being subsequently transferred to the OTP device 10. The trusted data store 21 can be infrastructure equipment or stand-alone equipment such as a handheld device.

FIG. 2B illustrates the use of a trusted random data generator 24. The trusted generator 24 includes a random data generation arrangement 22 for generating the random data, this data being generated at a time that the trusted random data generator 24 is in communication with the device 10 so that the random data can be passed immediately to the device 10. The trusted random data generator 24 also stores the random data it has generated in memory 23 and subsequently transfers this data to the complementary OTP apparatus 20. It will be appreciated that the random data could have been generated when the generator 24 was in communication with the apparatus 20 and then subsequently passed by the generator 24 to the device 10. It would also be possible for the generator 24 to only generate random data when in communication both the device 10 and apparatus 20 so that the random data is passed to both immediately, obviating the need for the memory 23. Conversely, the random data could be generated in advance of the trusted random data generator 24 being in communication with either of the device 10 and apparatus 20 in which case the random data is stored in memory 23 and subsequently passed to each of the device 10 and apparatus.

In the FIG. 2B form of the trusted random data generator 24, the random data is generated by the generator 24 acting alone. FIG. 2C shows a different form of the trusted random data generator 24 in which a QKD arrangement is used to generate the OTP data—in the illustrated scenario, the trusted random data generator 24 includes a QKD transmitter 26 arranged to interact with a QKD receiver 25 in the apparatus 20 in order to generate secret random data. The QKD transmitter 26 and receiver 25 can, of course, be swapped around; furthermore, the OTP data could alternatively be generated by a QKD interaction between the trusted generator 24 and a QKD entity in the device 10. As with the FIG. 2B trusted random data generator 24, the generator 24 of FIG. 2C also includes a memory 23 for storing the generated random data prior to transfer to the device 10 (or to the apparatus 20 if the QKD interaction was with the device 10).

The trusted random data generator 24 can be totally independent of the OTP device 10 and OTP apparatus 20 or can be associated with one of these entities—for example, the trusted random data generator 24 can be run by a bank that also runs the OTP apparatus 20.

Returning now to a consideration of the provisioning block 14 of the device 10, rather than the secret random data being generated using a QKD subsystem or being received by the provisioning block 14 from an external source, the OTP provisioning block 14 can include a random data generator 17 for generating random data which is both used to provision the memory 13 with OTP data, and passed via the data-transfer interface 12 directly or indirectly (including via a trusted data store) to other OTP apparatus with which the device 10 wishes to conduct OTP interactions. The random data generator is, for example, a quantum-based arrangement in which a half-silvered mirror is used to pass/deflect photons to detectors to correspondingly generate a "0"/"1" with a 50:50 chance; an alternative embodiment can be constructed based around overdriving a resistor or diode to take advantage of the electron noise to trigger a random event. Other techniques can be used for generating random data, particularly where a reduced level of security is acceptable—in such cases, some relaxation can be permitted on the randomness of the data allowing the use of pseudo random binary sequence generators which are well known in the art.

Where the secret random data is being received or being passed on via the classical data-transfer interface 12, it is highly desirable for the data to be encrypted (except possibly where a wired interface is being used to interface directly with OTP apparatus or a trusted data store). The encryption should not, of course, be based on the Vernam cipher using existing OTP data from the memory 13 since in this case as least as much OTP data would be consumed as newly provisioned; however the existing OTP data can be used to form a session key for the (relatively) secure transfer of the new secret random data.

It will be appreciated that the level of security that applies to the sharing of secret random data between the device 10 and other OTP apparatus sets the maximum level of security that can be achieved using a one-time pad formed from this data; accordingly, if the user of the device 10 wishes to use the OTP data held in the device 10 to achieve very high levels of security for data transfer from the device, then the initial sharing of the secret random data must involve corresponding levels of security; however, if the OTP data is only to be used for applications that do not warrant the highest levels of security, then the security surrounding secret random data sharing can be relaxed.

It will also be appreciated that the sharing of the secret random data used for the one-time pads is generally restricted to entities that know something about each other (such as their respective identities or some other attribute); accordingly, the sharing of the secret random data will normally be preceded by a verification or qualification process during which each entity satisfies itself that the other entity possesses appropriate attributes. This applies not only for the OTP device 10 and the complementary OTP apparatus 20, but also to the trusted data store 21 and the trusted random data generator 24 which should check the attributes of any entity purporting to be entitled to receive OTP data before such data is passed on to that entity.

The provisioning block 14 can simply append newly-obtained secret random data to the existing OTP data in memory 13 or can combine the new secret random data with the existing OTP data using a merge function, the merged data then replacing the previous contents of the memory 13. Preferably, the merge function is such that an eavesdropper who has somehow managed to obtain knowledge of the new secret random data, cannot derive any part of the merged data without also having knowledge of the pre-existing OTP data in the memory 13. A wide range of possible merge functions exist including functions for encrypting the new secret random data using the existing OTP data for the encrypting key, and random permutation functions (it will be appreciated that whatever merge function is used, it must be possible for the complementary OTP apparatus to select and use the same function on its copy of the new secret random data and its existing OTP data). Merging of the new secret random data and existing OTP data otherwise than by aggregation, can only be done if the device 10 and the complementary OTP apparatus have the same existing OTP data which should therefore be confirmed between the device and apparatus before the new secret random data and existing OTP data are subject to merging. In this respect, it will be appreciated that the OTP device 10 and the complementary OTP apparatus may not have the same existing OTP data for a variety of reasons such as a failed communication between the device and apparatus resulting in one of them consuming OTP data but not the other. Of course, it will frequently be possible for the OTP device and the complementary OTP apparatus to cooperate such that if either of them still has OTP data already discarded by the other, then that entity also discards the same data (one method of doing this is described later). However, it will not always be possible for the device 10 and the complementary OTP apparatus to cooperate in this way, or even check whether they have the same existing OTP data, at the time that one or other of the device and apparatus is provided with new secret random data—for example, if the OTP device is being replenished with new secret random data by communication with a trusted random data generator, it may well be that the trusted random data generator is not concurrently in communication with the OTP apparatus, the new secret random data only being subsequently shared with the OTP apparatus. In this type of situation, the new secret random data must be appended to the existing OTP data rather than being merged with it.

OTP Consumption Block 15

The OTP consumption block 15 is arranged to carry out tasks ('applications') that require the use ('consumption') of OTP data from the memory 13; it is to be understood that, unless otherwise stated herein, whenever data is used from the OTP data held in memory 13, that data is discarded. As already indicated, the OTP consumption block 15 is preferably provided by arranging for the main processor of the device 10 to execute OTP application programs; however, the consumption block 15 can additionally/alternatively comprise specialized hardware processing elements particularly where the OTP application to be executed involves complex processing or calls for high throughput.

A typical OTP consumption application is the generation of a session key for the exchange of encrypted messages with the complementary OTP apparatus; in this case, the complementary OTP apparatus can generate the same session key itself. Of course, the device 10 can securely communicate with the complementary OTP apparatus by encrypting data to be sent using the Vernam cipher—however, this would require the use of as much OTP data as there was data to be exchanged and so give rise to rapid consumption of the OTP data from memory 13.

Another OTP consumption application is the evidencing that the device 10 (or its owner/user) possesses a particular attribute. As already noted, the distribution of the secret random data used for the one-time pads is generally restricted to entities that know something about each other, such as their respective identities or the possession of other particular attributes (in the present specification, reference to attributes possessed by an entity includes attributes of a user/owner of the entity). An example non-identity attribute is an access authorisation attribute obtained following a qualification process that may involve the making of a payment. The secret random data will only be shared after each entity (or a trusted intermediary) has carried out some verification/qualification process in respect of the identity or other attributes of the other entity concerned. This verification/qualification can simply be by context (a bank customer replenishing their device 10 from an OTP apparatus within a bank may be willing to accept that the secret random data being received is shared only with the bank); however, verification/qualification can involve checking of documentary evidence (for example, a paper passport), or an automatic process such as one based on public/private keys and a public key infrastructure. Whatever verification/qualification process is used to control the sharing of secret random data, once such sharing has taken place, OTP data based on the secret random data can be used to prove the identity or other attributes of the possessor of the OTP data. Thus, for example, if OTP apparatus knows that it shares OTP data with an OTP device 10 with identity "X", then the device 10 can identify itself to the complementary OTP apparatus by sending it a data block from the top of its one-time pad; the apparatus then searches for this data block in the one or more OTP pads it possesses and if a match is found, it knows that it is communicating with entity "X". To aid finding a match, the device 10 preferably sends the OTP apparatus an identifier of the one-time pad that the device is proposing to use.

As already noted, communication failures and other issues can result in different amounts of OTP data being held by the OTP device 10 and the complementary OTP apparatus; more particularly, the data at the top of the one-time pad held by device 10 can differ from the data at the top of the one-time pad held by the complementary OTP apparatus. This is referred to herein as "misalignment" of the one-time pads. It is therefore convenient for the OTP device and the complementary OTP apparatus to each obtain or maintain a measure indicating how far it has progressed through its OTP data; this measure can also be thought of as a pointer or index to the head of the OTP pad and is therefore referred to below as the "head index". Preferably, the head index is taken as the remaining size of the OTP data; although other measurements can be used for the head index (such as how much OTP data has been used), measuring the remaining size of the OTP data can be done at any time and so does not require any on-going maintenance. Whatever actual numeric value of the measure used for the head index, in the present specification the convention is used, when discussing head index values, that the nearer the top of the one-time pad is to the bottom of the pad, the "lower" is the value of the head index.

The head index is used to correct for misalignment of the one time pads held by the device 10A and the complementary OTP apparatus as follows. At the start of any OTP interaction, the device 10 and complementary OTP apparatus exchange their head indexes and one of them then discards data from the top of its one-time pad until its head index matches that received from the other—that is, until the one-time pads are back in alignment at the lowest of the exchanged head index values. When OTP data is used by the device or apparatus in conducting the OTP transaction, the head index is sent along with the OTP interaction data (e.g. an OTP encrypted message) to enable the recipient to go directly to the correct OTP data in its one-time pad; this step can be omitted since although the one-time pads may have become misaligned by the time a message with OTP interaction data successfully passes in one direction or the other between the device and apparatus, this misalignment is likely to be small and a trial-and-error process can be used to find the correct OTP data at the receiving end.

The Complementary OTP Apparatus

With regard to the complementary OTP apparatus with which the OTP device 10 shares the same OTP data and can therefore conduct an OTP-based interaction, this can be constituted by apparatus in which all three functions of OTP storage, provisioning, and consumption are contained within the same item of equipment (as with the device 10); such OTP apparatus is referred to herein as "self-contained" OTP apparatus. However, it is also possible for the complementary OTP apparatus to be distributed in form with one of the OTP storage, provisioning, and consumption functions being in a separate item of equipment from the other two, or with all three functions in separate items of equipment to the OTP storage and provisioning functions; such OTP apparatus is referred to herein as "distributed" OTP apparatus. In distributed OTP apparatus it is, of course, necessary to ensure an adequate level of security for passing OTP data between its distributed functions. It is conceivable that one or both of the provisioning and consumption functions are provided by equipment that is also used by another distributed OTP apparatus.

To illustrate the different roles that self-contained and distributed OTP apparatus can play, FIG. 3 shows the OTP device 10 conducting an OTP interaction with a distributed data processing system 27 such as a banking system. The distributed system 27 comprises a central computer facility 28 that communicates with a plurality of customer-interfacing units 29 by any suitable communications network. The device 10 can communicate with one or more of the units 29 using its classical data-transfer interface 12.

In one possible scenario, each of the units 29 is a self-contained OTP apparatus holding OTP data that is distinct from the OTP data held by any other unit 29; in this case, assuming that the device 10 only holds one pad of OTP data, it is restricted to interacting with the unit 29 that holds the same pad. Alternatively, the OTP device 10 can be arranged to hold multiple pads of OTP data each corresponding to a pad held by a respective one of the units 29, the device 10 then needing to use data from the correct pad for the unit 29 with which it wishes to conduct an OTP interaction.

In an alternative scenario, the central computer facility 28 is a self-contained OTP apparatus, the device 10 conducting the OTP interaction with the facility 28; in this case, each of the units 29 is simply a communications relay for passing on the OTP interaction messages.

In a further alternative scenario, the central computer facility 28 holds the OTP data shared with the device 10 but the units 29 are consumers of that data; in this case, the device 10 conducts the OTP interaction with one of the units, the unit obtaining the needed OTP data from the facility 28 over the internal network of the distributed system. In this scenario, the distributed system 27 forms a distributed OTP apparatus.

It may be noted that in the last scenario, it is possible to arrange for each of the units 29 to be capable of taking part in an OTP provisioning operation with the device 10, either by passing on to the central computer facility 28 secret random data provided by the device 10, or by generating random data and passing it both to the device 10 and to the central facility 28; in this latter case, the units 29 independently generate their random data.

Whatever the form of the complementary OTP apparatus, it may have been designed to carry out OTP interactions with multiple different devices 10, each with its own OTP data. This requires that the complementary OTP apparatus hold multiple different pads of OTP data, one for each device 10 with which it is to conduct OTP interactions; it also requires that the OTP apparatus uses the correct OTP data when interacting with a particular OTP device 10. One way of enabling the OTP apparatus to determine quickly which is the correct pad of OTP data to use in respect of a particular device 10, is for each pad to have a unique identifier which the device sends to the apparatus when an OTP interaction is to be conducted. It is not necessary for this identifier to be sent securely by the device 10 (unless there are concerns about an eavesdropper tracking patterns of contact between particular devices and the apparatus).

Hierarchical Distribution

FIG. 4 depicts a hierarchical way of sharing secret random data between multiple OTP devices 10A, 10B, 10C and a complementary OTP apparatus 20 that may be of self-contained or distributed form.

Provisioning Phase

In a provisioning phase of operation, the device 10A and apparatus 20 first share new secret random data 30 in any appropriate manner—see arrow 27. This can be achieved using any of the methods described above when discussing the OTP provisioning block 14, including by use of a trusted data store or trusted OTP generator. The apparatus 20 stores the new secret random data in memory 26 and the device 10 holds the new secret random data in its OTP memory 13 (not separately shown in FIG. 4).

This new secret random data 30 is preferably logically composed of a number of pages (four such pages 31 to 34 are shown in FIG. 4) with the division of the data 30 into the pages 31 to 34 being known both to the apparatus 20 and to the device 10A. Preferably, each of the pages 31 to 34 is individually identified by a fixed unique identifier. The page identifier could, for example, be the first 32 bits of OTP data on the page, it being understood that these 32 bits would not then be used as OTP data.

After receiving the new secret random data 30, the device 10A transfers page 33 of the data to a second OTP device 10B and page 34 of the data to a third OTP device 10C—see arrows 28; the device 10A retains pages 31 and 32 (but not pages 33 and 34). This transfer of the secret random data can be effected using any one or more of the methods described above in relation to the OTP provisioning block 14, including via a trusted data store.

Assuming that the device 10A and apparatus 20 interact directly with each other during the provisioning process, it is possible for them to align their existing OTP data (if any) at this time thereby enabling them to combine the new secret random data pages 31 and 32 with the existing OTP data for device 10A by merging. Of course, unless the apparatus already knows that the device 10A is going to retain pages 31 and 32 for combination with its existing OTP data (for example, because device 10A is pre-programmed always to retain the first two pages it receives), it will be necessary for the device 10A to inform the apparatus 20 which of the pages 31-34 it has retained and are to be merged with the existing OTP data. In this latter case, the device 10A preferably informs the apparatus 20 of which pages are being retained by sending the aforesaid identifiers of these pages to the apparatus.

As regards the devices 10B and 10C, since it is unlikely that these devices are in communication with the apparatus 20 at the time they are provided with the pages 33 and 34 respectively, it is preferred to arrange for the devices 10B and 10C to defer merging newly-received secret random data with their existing OTP data until the next time each device 10B, 10C interacts with the apparatus 20. At that time, the device 10B/10C and apparatus 20 align their corresponding existing one-time pads and the device 10B/10C informs the apparatus 20 which page 33/34 it has received; the device 10B/10C and apparatus 20 can now merge the new secret random data with their existing OTP data relevant to the device concerned.

It may be noted that in appropriate circumstances the devices 10B, 10C need not defer merging their new secret random data with their existing OTP data until a pad alignment operation has been effected with the apparatus 20. One such circumstance is where there is a high probability that the devices will have consumed at least as much of their one-time pads as the apparatus 20 (which could be the case if the apparatus never seeks to initiate an OTP interaction and merely uses its OTP data to match received OTP data or to decrypt messages encrypted by a device using its OTP data); in such a circumstance, the devices 10B, 10C records the state of their one-time pads prior to merging in their new secret random data and subsequently pass on this information to the apparatus so it can align its copies of the one time pads concerned before itself effecting the merge operations.

Where the new secret random data provided by the pages 31-34 is merged into the existing OTP data of the devices 10A, 10B, 10C, a useful way of identifying a particular one-time pad in its current version (that is, its version following its last merge with new secret random data), is to use the unique page identifier of the last page of new secret random data merged into the pad concerned. This identifier would be stored by the device concerned as well as the apparatus 20.

Of course, the pages 31-34 of new secret random data can simply be appended to the existing OTP data of the devices concerned, so that the distributed pages of secret random data directly constitutes OTP data. Each page then effectively constitutes a separate one-time pad. For simplicity, in the following description it will assumed be that the pages 31-34 are appended to existing OTP data rather than merged with that data.

In a typical scenario, the OTP device 10A belongs to a person who is a parent in a family and the OTP devices 10B and 10C to other family members. The OTP apparatus 20 could be provided by a bank visited periodically by the user of device 10A to effect a provisioning interaction (either via the classical data-transfer channel of the device or by using a QKD channel). The transfer of secret random data from the device 10A to the devices 10B, 10C is via the classical data-transfer interface 12 (typically embodied for this purpose as a wired connection or IrDA link).

It will be appreciated that the number of subsidiary OTP devices receiving secret random data from the device 10A can differ from the two devices 10B, 10C in the above-described example. It will also be appreciated that the depth of the provisioning hierarchy can be increased, that is, for example, the OTP device 10B can itself pass on to another OTP device, part of the secret random data it has received from the device 10A and so on (subject to any restriction regarding only dealing in whole pages of secret random data). Within each device, it is the provisioning block 14 which is responsible for effecting the operations resulting in the hierarchical distribution of secret random data.

Consumption Phase

In a consumption phase of operation, the OTP devices 10A, 10B and 10C independently carry out OTP interactions with the OTP apparatus 20. It will generally be helpful to provide the apparatus 20 with an indication of the OTP pad being used by an interacting OTP device, whether the OTP pad is simply an un-merged page 31-34 or a pad formed by merging the relevant page(s) with pre-existing data. To this end, it is possible for the OTP device to send a fixed identifier of the page or pad being used (for example, a page or pad identifier of the form mentioned above)—however, this has the disadvantage of enabling an eavesdropper to detect when the same device effects subsequent interactions with the apparatus. Where the apparatus 20 only participates in device interactions that only involve the apparatus using OTP data to interpret incoming OTP data sent by the OTP device or messages encrypted using device OTP data, it is reasonably certain that the apparatus will not have consumed more OTP data than the device concerned; in this case, the OTP device can use data off the top of its OTP pad to identify that pad, the apparatus simply searching the pads it holds for the OTP data sent by the device. However, where there is no certainty that the apparatus has not consumed more OTP data than the device, an alternative approach would be for the device to send data from the bottom of its OTP pad to enable the apparatus to identify the pad being used; in this case, although such data should not be re-used (so that the next pad identification transmission must use data further up from the bottom of the pad), the at least notional bottom of the pad is not changed since this would affect the above-described head-index mechanism used for pad alignment.

In principle, it is not necessary for an OTP device 10A, 10B, 10C to send any page/pad identifier since it is possible for the apparatus 20 to use a trial-and-error method to determine which pad is being used. however, this is likely to use large amounts of computational resources.

After identification of the one-time pad to be used for a device interaction with the apparatus 20, the above-described head-index-based mechanism for aligning OTP data between device and apparatus, is preferably carried out. Where the pages 31 to 34 have not been merged into the pre-existing OTP of the devices, each of pages 31 to 34 is preferably treated as a separate one-time pad with its own head index.

Thereafter, an OTP consumption application is executed by the OTP device 10A, 10B, 10C resulting in the consumption of OTP data in an interaction between the device and the apparatus 20. The OTP consumption application can be any requiring the use of OTP data such as encryption/decryption of messages exchanged with the complementary OTP apparatus 20, or the evidencing of particular attributes to the apparatus 20.

Usage Tracking

Figure 5:
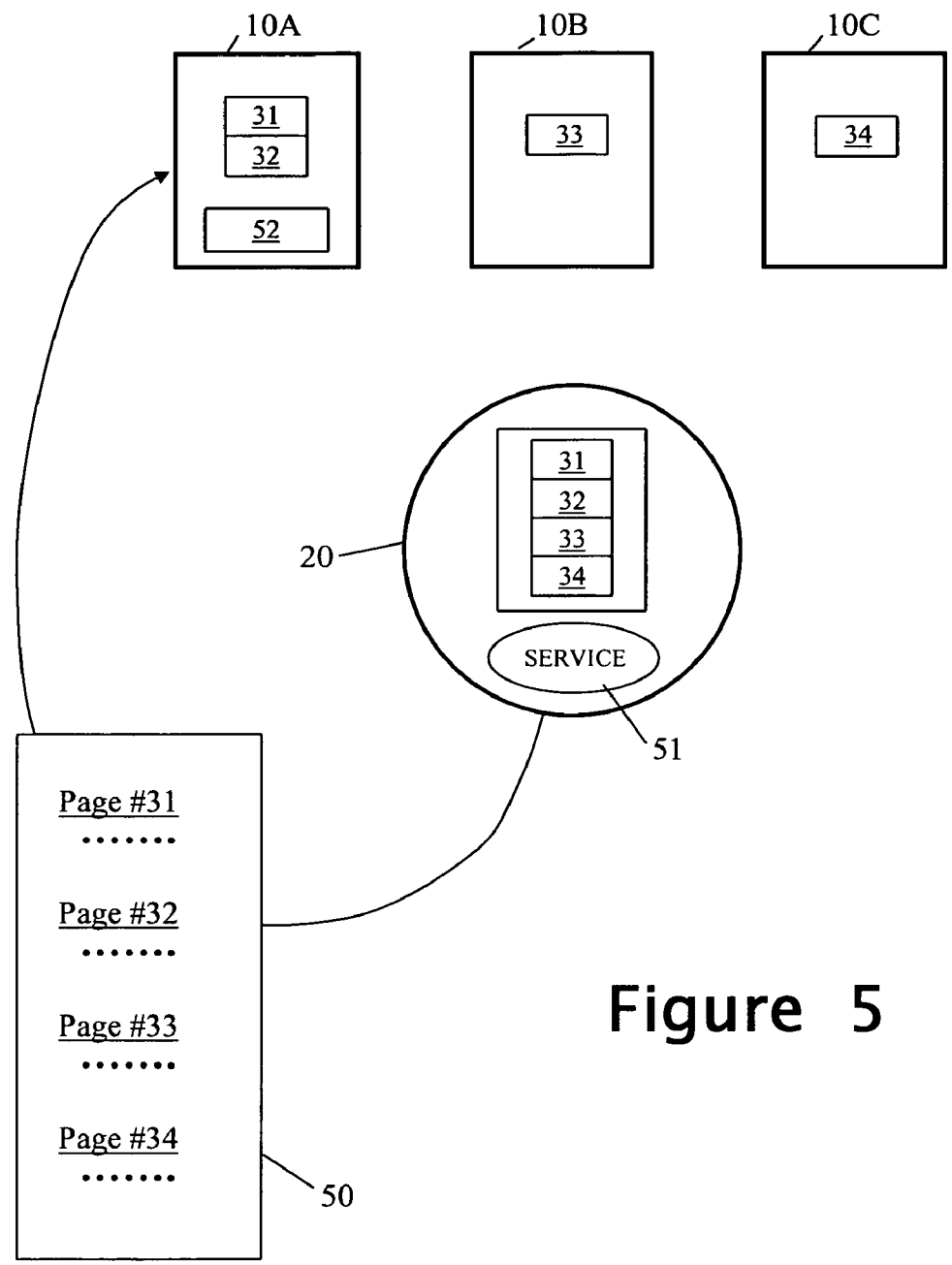
FIG. 5 is a diagram illustrating billing for services accessed using OTP data hierarchically distributed as illustrated in FIG. 4.

In many situations it will be desirable to track possession and usage of the secret random data 30 by the devices 10A, 10B, 10C. For example, where OTP data is used to evidence possession by a device of an attribute (for example, a user account) entitling it to use a specific fee-bearing service provided by the apparatus 20, then all usages of the service based on the secret random data 30 are likely to be billed by the apparatus 20 to the device 10A which is then responsible for allocating the cost to the other devices 10B and 10C. FIG. 5 illustrates one implementation of such a billing scenario. In FIG. 5, the apparatus 20 periodically provides a bill 50 to device 10A (or its owner/user) including a usage record indicating how many usages have been made of a service 51 that has been accessed on the basis of OTP data taken or derived from the secret random data 30; the usage record is broken down to show how many usages are based on OTP data from each of the four pages 31-34 (where the pages have been merged into the pre-existing OTP data of the corresponding devices, then the usage record is preferably broken down against pad identifiers taking the form of the identifier of the last page merged into the pre-existing OTP data of the device concerned). The OTP data itself is not revealed. The provisioning block 14 of the device 10A is arranged to make and keep a distribution record 52 at the time it distributes the pages 33, 34, to indicate which device 10B, 10C received which page 33, 34. Therefore, when the device 10A receives the bill 50, it is able to determine how many usages of the service 51 are attributable to itself and how many are attributable to the devices 10B and 10C respectively. The device 10A can then charge devices 10B and 10C for their usages.

Of course, where the distribution hierarchy extends beyond the OTP devices 10B, 10C, these devices will have themselves made and kept distribution records of their sub-distribution of the secret random data pages they received and these records will, together with the relevant parts of the bill 50, enable them to charge their descendant devices accordingly and so on. The individual distribution records made by the OTP devices together form an overall distribution record indicating how the secret random data 30 was distributed between the devices Where the devices 10A, 10B, 10C can intercommunicate without undue difficulty, then the devices lower in the distribution hierarchy can be arranged to pass back to the root device 10A their individual distribution records so that the device 10A can derive an overall distribution record and directly attribute billed service usage to particular devices. Rather than the device 10A carrying out this role, another trusted entity can be used to collect the individual distribution records from the devices 10A, 10B, 10C; indeed, this trusted entity could be the apparatus 20 itself in which case billing could be effected directly to the devices making use of the service 51.

In fact, in the case of the use of OTP data to gain access to a service such as the service 51, once the data has been used it will not matter if it becomes public (unless there is a concern that this could provide information about how the secret random data was generated). The bill could therefore use the OTP data itself to indicate the entity accessing the service 51 without the need to use page identifiers. However, this would require the device 10A keeping a full copy of the secret random data it has passed on (as well as an indication regarding what data was passed to which devices). It is therefore preferred to use the page-identifier based system described above.

It may be noted that use of the head-index-based mechanism for aligning OTP data on a particular page 31-24 held by a device 10A-C and the apparatus 20, means that when a bill 50 is received, there should be no subsequent service usage billing associated with OTP data higher up the page than the lowest OTP data already associated with a billed service usage. This is because the OTP data higher up the page will already either have been used for access to the service 51 at the time the bill 50 is generated (and so should be on the bill), or have been discarded.

It will be appreciated that there may be multiple different services 51 and the apparatus 20 can record the identity of the service being accessed by a device 10A, 10B, 10C when granting access to the service; the service identity can be included in bill 50 against the one-time pad (or OTP data) that was used to gain access to the service. The service(s) 51 is not necessarily provided by the apparatus 20 itself, in which case the role of the apparatus is restricted to access control and reporting service usage.

Variants

Although the secret random data 30 has been described as divided into pages 31-34 according to a division known at the outset to the apparatus 20 and device 10A, it is also possible for each device to decide for itself how much of the secret random data it receives is to be retained and how much is to be passed on to each of its child devices. In this case, where a record is to be kept regarding the distribution of the data, this can be done in terms of the start and stop positions of the blocks of retained and passed-on data within the original data 30 (of course, the start and stop positions of the passed-on data would need to be provided to the devices receiving that data). The blocks of retained data effectively constitute pages but now the page sizes are likely to vary and are defined by the retained-block start and stop positions. The start and stop positions of a page newly retained by a device can be passed to the apparatus 20 when next the device communicates with the apparatus (it may also be necessary to identify the data 30 itself—for example, by its first 32 bits—in case multiple blocks 30 are provided before contact is made with the apparatus). When billing for service usage, the apparatus 20 identifies either the page from which OTP data has been consumed to gain service access, or in cases where page data has been merged with preexisting OTP data, the page last merged with the pre-existing OTP data. The identified page is identified by its start position in the block of data 30 (again, it may be necessary also to identify the block of data 30 concerned). This information enables each device to determine whether a billed usage was due to its own actions of those of a descendant device.

It will be appreciated that an OTP device in the distribution hierarchy that passes on secret random data to one or more other devices has the possibility of securely retaining a copy of the data it passes on (though not for use by the consumption block 15)—the device may wish to do so for purposes of tracking usage to enable billing reconciliation as already described, or for the purpose of enabling it to decrypt messages encrypted with OTP data derived from the passed-on secret random data (either using the Vemom cipher or by using the OTP data as a session key). A descendant device (that is, one directly or indirectly dependent from another device in the hierarchical distribution arrangement) can therefore repudiate any transaction based on the secret random data it has received through the distribution hierarchy as any ancestor device (any device between the subject descendant device and the root of the hierarchy, including the root itself) could equally have effected the transaction. As a result, using a hierarchical distribution arrangement is most suitable for use in situations where:

the root device of the distribution hierarchy is willing to accept responsibility for use of the secret random data which it passes down the distribution hierarchy; and ancestor devices wish to be able to access messages encrypted by a descendant device.

It is alternatively possible to use trusted platform technology to ensure that each OTP device passing on random secret data in a hierarchical distribution does not retain a copy of that data.

Many variants are possible to the above described embodiments of the invention. For example, although in the foregoing, embodiments of the invention have been described in relation to OTP devices that incorporate, in a self-contained form, OTP storage, provisioning, and consumption, it is to be understood that the devices could generally be replaced by a distributed arrangement of their functional blocks.

Furthermore, in order to reduce the need to effect re-provisioning with secret random data, it is possible to arrange for devices to consume their one-time pad data more than once where the security requirements permit such a reduction in the level of security. Such "n-time" use of the OTP data does not change the character of the secret random data subject to hierarchical distribution—the secret random data is still suitable for use as one-time pad data and the accompanying claims are to be understood accordingly.

The invention claimed is:

1. A method of provisioning a plurality of devices with respective new one-time pad data for use in interacting with an apparatus holding the same one-time pad data, the method comprising:
provisioning a first device with new one-time pad data including a block of secret random data that is, or will become, available to said apparatus, wherein the block of secret random data is logically divided into pages of predetermined size;
distributing the secret random data received by the first device between said devices in a hierarchical distribution pattern headed by the first device; each device, other than those at an end of the distribution hierarchy, retaining a part of the secret random data it receives and passing on respective parts of the remaining data to each device dependent from it in the distribution hierarchy, the parts of the secret random data that are retained or passed on being whole pages,
using that part of the secret random data retained by each device to provide the device with its said new one-time pad data,
wherein at least one said device has pre-existing one-time pad data, the device using the secret random data it has retained to provide said new one-time pad data by combining the retained secret random data with the pre-existing one-time pad data.

2. The method according to claim 1, wherein combining the retained secret random data with the pre-existing one-time pad data includes appending the retained secret random data to the pre-existing one-time pad data already held by the device.

3. The method according to claim 1, wherein combining the retained secret random data with the pre-existing one-time pad data includes merging the retained secret random data with the pre-existing one-time pad data according to a predetermined merge function, the merge function being such that a party with knowledge of the secret random data retained by the device, cannot derive any part of the merged data without also having knowledge of the pre-existing one-time pad data.

4. The method according to claim 3, wherein the device defers merging its retained secret random data with its pre-existing one-time pad data until the device has been able to communicate with said apparatus to align a start of the device's pre-existing one-time pad data with the corresponding one-time pad data held by said apparatus.

5. The method according to claim 3, wherein the device prior to merging its retained secret random data with its pre-existing one-time pad data, records alignment data indicative of how much of the pre-existing one-time pad data remains, the device subsequently passing this alignment data to said apparatus to enable the apparatus to bring its corresponding one-time data into alignment with the pre-existing one-time pad data of the device in preparation for the apparatus effecting a merge operation duplicating that performed by the device in providing its new one-time pad data.

6. The method according to claim 1, wherein each device, other than those at the end of the distribution hierarchy, independently determines how much of the secret random data received by the device is to be retained and how much is to be passed on.

7. The method according to claim 1, further comprising each device that is not at the end of the distribution hierarchy, making a record of which part of said block of secret random data it passes to each device dependent from it in the distribution hierarchy.

8. The method according to claim 7, further comprising collecting together said records at an entity thereby to enable that entity to determine the overall distribution of the block of secret random data between devices.

9. The method according to claim 1, wherein trusted platform technology is used to prevent any said device from retaining secret random data that it has passed on to a dependent device in the distribution hierarchy.

10. The method according to claim 1, wherein each device that passes on secret random data to a dependent device in the distribution hierarchy, also retains a copy of that data for future reference.

11. A method of tracking service usage in a system comprising a plurality of devices each with a one-time pad provisioned with one-time pad data according to the method of claim 1, and an apparatus holding one-time pads matching those of the devices, the apparatus serving to control access to at least one service by requiring that any said device wishing to access a said service, prove its entitlement to do so by means of an interaction with the apparatus that consumes matching one-time pad data held by the device and the apparatus; the method of tracking service usage comprising:
keeping a first record indicative of the distribution of said block of secret random data between said devices;
creating a second record indicative, for each service usage by a said device, of the one-time pad, or one-time pad data, used to gain access to the service; and
using the first and second records to determine the usage made of said at least one service by each device.

12. The method according to claim 11, wherein the first record is formed by consolidation of a plurality of sub-records, one for each said device that is not at the end of the distribution hierarchy, each sub-record having been compiled by a corresponding device and indicating what part of said block of secret random data the corresponding device has passed on to each device dependent from it in the distribution hierarchy.

13. The method according to claim 11, wherein the first record is a distributed record made up of a respective sub-record for each said device that is not at the end of the distribution hierarchy, each sub-record being held by a corresponding device and indicating what part of said block of secret random data the corresponding device has passed on to each device dependent from it in the distribution hierarchy; the determination of the usage made of said at least one service by each device being effected by each device that holds a said sub-record, starting with said first device and progressing down said hierarchy, determining whether a service usage indicated by said record was accessed using a one-time pad, or one-time pad data, attributable to the corresponding device or to one of its dependent devices.

14. A device comprising:
a communications interface for transferring secret random data on and off the device;
a memory for holding one-time pad data,
a consumption arrangement, implemented by a processor, for using one-time pad data from the memory to carry out a security-related task; and
a provisioning arrangement, implemented by the processor, for receiving new one-time pad data including secret random data logically divided into pages of predetermined size via the communications interface, retaining a part of the received secret random data, and passing respective parts of the remainder of the received secret random data onto one or more other devices in a hierarchical distribution pattern, wherein each device, other than those at an end of the distribution hierarchy, retains a part of the secret random data it receives and passes on respective parts of the remaining data to each device dependent from it in the distribution hierarchy, the parts of the secret random data that are retained or passed on being whole pages; the provisioning arrangement being arranged to use the retained part of the secret random data to provision the memory with new one-time pad data by combining the retained secret random data with pre-existing one-time pad data already held by the device in its memory.

15. The device according to claim 14, wherein combining the retained secret random data with the pre-existing one-time pad data includes appending the retained secret random data to the pre-existing one-time pad data already held by the device in its memory.

16. The device according to claim 14, wherein combining the retained secret random data with the pre-existing one-time pad data includes merging the retained secret random data, according to a predetermined merge function, with the pre-existing one-time pad data already held by the device in its memory, the merge function being such that a party with knowledge of the secret random data retained by the device, cannot derive any part of the merged data without also having knowledge of the pre-existing one-time pad data.

17. The device according to claim 16, the provisioning arrangement is arranged to defer merging its retained secret random data with its pre-existing one-time pad data until the device has been able to communicate with an apparatus holding one-time pad data corresponding to said pre-existing one-time pad data of the device whereby to align a start of the device's pre-existing one-time pad data with the corresponding one-time data held by said apparatus.

18. The device according to claim 16, wherein the provisioning arrangement is so arranged that prior to merging its retained secret random data with its pre-existing one-time pad data, the provisioning arrangement records alignment data indicative of how much of the pre-existing one-time pad data remains, the provisioning arrangement being further arranged to subsequently passing this alignment data to said apparatus to enable the apparatus to bring its corresponding one-time data into alignment with the pre-existing one-time pad data of the device in preparation for the apparatus effecting a merge operation duplicating that performed by the device in providing its new one-time pad data.

19. The device according to claim 14, wherein the provisioning arrangement is arranged to make a record of which part of the received secret random data it passes to the or each other device.

20. The device according to claim 14, wherein trusted platform technology is used to prevent the device from retaining secret random data that it has passed on to another said device.

21. The device according to claim 14, wherein the device is arranged to retain, for future reference, a copy of that part of the secret random data that it passes on.

* * * * *